(12) United States Patent
Koike et al.

(10) Patent No.: US 11,319,641 B2
(45) Date of Patent: May 3, 2022

(54) ELECTRODEPOSITION COATING FACILITY

(71) Applicant: Taikisha Ltd., Tokyo (JP)

(72) Inventors: Toshihiko Koike, Tokyo (JP); Yasuhiko Sakota, Tokyo (JP); Yoshikazu Hayashi, Tokyo (JP)

(73) Assignee: Taikisha Ltd., Tokyo (JP)

( * ) Notice: Subject to any disclaimer, the term of this patent is extended or adjusted under 35 U.S.C. 154(b) by 231 days.

(21) Appl. No.: 16/473,016

(22) PCT Filed: Dec. 4, 2018

(86) PCT No.: PCT/JP2018/044528
§ 371 (c)(1),
(2) Date: Aug. 29, 2019

(87) PCT Pub. No.: WO2019/163251
PCT Pub. Date: Aug. 29, 2019

(65) Prior Publication Data
US 2021/0246566 A1     Aug. 12, 2021

(30) Foreign Application Priority Data

Feb. 26, 2018   (JP) .............................. JP2018-032380

(51) Int. Cl.
*C02F 1/00*     (2006.01)
*C02F 1/46*     (2006.01)
(Continued)

(52) U.S. Cl.
CPC .............. *C25D 13/20* (2013.01); *C02F 1/004* (2013.01); *C02F 1/46104* (2013.01);
(Continued)

(58) Field of Classification Search
CPC ........ C25D 13/20; C25D 13/22; C25D 11/00; C25D 11/005; C25D 13/24;
(Continued)

(56) References Cited

U.S. PATENT DOCUMENTS 3,738,925 A * 6/1973 Cooke ...................... C09D 7/80
204/541
3,865,706 A * 2/1975 Cooke .................... C25D 13/22
204/482
(Continued)

FOREIGN PATENT DOCUMENTS

AU              605024 B2     8/1989
CA              1333580 C    12/1994
(Continued)

*Primary Examiner* — Joseph W Drodge
(74) *Attorney, Agent, or Firm* — The Webb Law Firm

(57) ABSTRACT

The amount of wash water to be consumed in an electrodeposition coating facility and the amount of used wash water to be discharged that requires post-treatment are reduced. To achieve this object, an electrodeposition coating facility that includes a degreasing process section A, a post-degreasing rinse section B, a chemical conversion process section C, a post-chemical-conversion rinse section D, an electrodeposition coating section E, and a post-electrodeposition rinse section F is provided with a filtration process apparatus 4 and a wash water recycling line 5. The filtration process apparatus 4 performs a filtration process on wash water W after being used to wash an object to be coated 1 in the post-electrodeposition rinse section F. The wash water recycling line 5 feeds, to the post-chemical-conversion rinse section D, the wash water W after being subjected to the filtration process in the filtration process apparatus 4 as wash water W to be used to wash an object to be coated in the post-chemical-conversion rinse section D.

7 Claims, 9 Drawing Sheets

(51) Int. Cl.
*C25D 13/20* (2006.01)
*C25D 13/22* (2006.01)
*C25D 13/24* (2006.01)
*C02F 1/461* (2006.01)
*C02F 103/16* (2006.01)

(52) U.S. Cl.
CPC .............. *C25D 13/22* (2013.01); *C25D 13/24* (2013.01); *C02F 2103/16* (2013.01)

(58) Field of Classification Search
CPC .. C02F 1/46104; C02F 1/004; C02F 2103/16; C02F 1/001; C02F 1/444; C02F 1/46; C02F 1/461; C02F 2103/14; C02F 2201/461; C02F 2201/46105; C02F 2201/4611; B01D 36/00; B01D 36/02; B01D 37/00; B01D 61/14; B01D 61/145; B01D 61/16; B01D 61/18; B01D 61/20; B01D 2311/04; B01D 2311/06; B01D 2311/25; B01D 2311/26; B01D 2311/2649; B01D 2311/2684; B05D 3/00; B05D 3/002; B05D 3/007; B05D 3/10; B05D 3/102; B05D 3/107; B05D 3/14; B05D 5/00; B05D 5/12; C23C 18/00; C23C 18/18; C23C 18/1803; C23C 18/1806; C23C 22/00; C23C 22/02; C23C 22/78; C23C 22/86; C23C 28/00; B08B 3/08; B08B 3/10
See application file for complete search history.

(56) References Cited

U.S. PATENT DOCUMENTS

| | | | | | |
|---|---|---|---|---|---|
| 5,009,758 | A | * | 4/1991 | Okada | B01D 36/02 118/602 |
| 5,164,080 | A | * | 11/1992 | Furuno | B01D 61/16 210/195.1 |
| 6,090,254 | A | * | 7/2000 | Sobata | C23C 22/00 204/471 |
| 6,139,708 | A | * | 10/2000 | Nonomura | C23C 22/00 204/482 |
| 10,676,839 | B2 | | 6/2020 | Katayama et al. | |
| 2001/0035126 | A1 | * | 11/2001 | Nonomura | C25D 13/22 118/621 |
| 2003/0066791 | A1 | * | 4/2003 | Yaegashi | C23C 22/86 210/167.29 |
| 2003/0168406 | A1 | * | 9/2003 | Itoh | C25D 13/24 210/650 |
| 2004/0020567 | A1 | * | 2/2004 | Baldwin | C25D 3/02 148/273 |
| 2004/0144451 | A1 | * | 7/2004 | Matsukawa | C23C 22/83 148/247 |
| 2009/0101512 | A1 | * | 4/2009 | Kubota | C08G 18/8077 205/170 |
| 2011/0290652 | A1 | * | 12/2011 | Meade | C25D 13/24 205/100 |
| 2015/0292103 | A1 | * | 10/2015 | Nemoto | C23C 22/367 428/413 |
| 2016/0153107 | A1 | * | 6/2016 | Nemoto | C09D 175/04 428/418 |
| 2017/0342588 | A1 | * | 11/2017 | Arimori | C25D 13/00 |

FOREIGN PATENT DOCUMENTS

| | | |
|---|---|---|
| CN | 1090342 A | 8/1994 |
| CN | 102847651 A | 1/2013 |
| CN | 103436941 A | 12/2013 |
| JP | 10099777 | 4/1998 |
| JP | 2002235196 A | 8/2002 |
| JP | 2009052068 | 3/2009 |
| JP | 2012052159 | 3/2012 |
| WO | 2017010504 A1 | 1/2017 |

* cited by examiner

ELECTRODEPOSITION COATING FACILITY

CROSS-REFERENCE TO RELATED APPLICATIONS

This application is the United States national phase of International Application No. PCT/JP2018/044528 filed Dec. 4, 2018, and claims priority to Japanese Patent Application No. 2018-032380 filed Feb. 26, 2018, the disclosures of which are hereby incorporated by reference in their entirety.

TECHNICAL FIELD

The present invention relates to an electrodeposition coating facility.

More specifically, an electrodeposition coating facility according to the present invention includes a degreasing process section, a post-degreasing rinse section, a chemical conversion process section, a post-chemical-conversion rinse section, an electrodeposition coating section, and a post-electrodeposition rinse section.

In the degreasing process section, an object to be coated is subjected to a degreasing process using a degreasing solution, in the post-degreasing rinse section, the object to be coated that has been processed in the degreasing process section is washed with wash water, in the chemical conversion process section, the object to be coated that has been washed in the post-degreasing rinse section is subjected to a chemical conversion process using a conversion solution, in the post-chemical-conversion rinse section, the object to be coated that has been processed in the chemical conversion process section is washed with wash water, in the electrodeposition coating section, the object to be coated that has been washed in the post-chemical-conversion rinse section is subjected to electrodeposition coating using an electrodeposition solution, and in the post-electrodeposition rinse section, the object to be coated that has been subjected to electrodeposition coating in the electrodeposition coating section is washed with wash water.

BACKGROUND ART

This kind of electrodeposition coating facility is proposed in Patent Document 1 below.

In the electrodeposition coating facility proposed in Patent Document 1, wash water that has been used to wash an object to be coated after being subjected to electrodeposition coating in a post-electrodeposition rinse section is subjected to an electrolysis process.

Contaminants that are generated in the wash water due to this electrolysis process are separated from the wash water.

The wash water from which the contaminants have been separated is returned to the post-electrodeposition rinse section and is again used to wash an object to be coated in the post-electrodeposition rinse section.

In another electrodeposition coating facility proposed in Patent Document 1, wash water that has been used to wash an object to be coated after being subjected to a chemical conversion process in a post-chemical-conversion rinse section is subjected to an electrolysis process.

Contaminants that are generated in the wash water due to this electrolysis process are separated from the wash water.

The wash water from which the contaminants have been separated is fed to a post-degreasing rinse section and is used to wash an object to be coated in the post-degreasing rinse section.

PRIOR ART DOCUMENTS

Patent Documents

Patent Document 1: JP H10-99777A (particularly, claims 1 and 2)

DISCLOSURE OF THE INVENTION

Problem to be Solved by the Invention

However, in the case of using an electrolytic water treatment apparatus that thus electrolyzes used wash water, turns contaminants that are generated in the wash water due to this electrolysis process into sludge or the like and removes the sludge from the wash water, the cost of the apparatus is high.

Moreover, this electrolytic water treatment apparatus consumes a large amount of electric power, and thus the running cost increases.

For these reasons, the method proposed in Patent Document 1 (i.e. the method of using the aforementioned electrolytic water treatment apparatus) has the problem of the cost of the facility and the cost of running the facility being high.

In view of the foregoing situation, a main object of the present invention is to effectively solve the above-stated problems without decreasing the coating quality, for example, by employing a reasonable mode of the facility.

Means for Solving Problem

A first characteristic configuration of the present invention relates to an electrodeposition coating facility, and the characteristics thereof lie in an electrodeposition coating facility that includes a degreasing process section, a post-degreasing rinse section, a chemical conversion process section, a post-chemical-conversion rinse section, an electrodeposition coating section, and a post-electrodeposition rinse section, in the degreasing process section, an object to be coated is subjected to a degreasing process using a degreasing solution, in the post-degreasing rinse section, the object to be coated that has been processed in the degreasing process section is washed with wash water, in the chemical conversion process section, the object to be coated that has been washed in the post-degreasing rinse section is subjected to a chemical conversion process using a conversion solution, in the post-chemical-conversion rinse section, the object to be coated that has been processed in the chemical conversion process section is washed with wash water, in the electrodeposition coating section, the object to be coated that has been washed in the post-chemical-conversion rinse section is subjected to electrodeposition coating using an electrodeposition solution, and in the post-electrodeposition rinse section, the object to be coated that has been subjected to electrodeposition coating in the electrodeposition coating section is washed with wash water, the electrodeposition coating facility including:
a filtration process apparatus; and
a wash water recycling line,
wherein the filtration process apparatus performs a filtration process on wash water after being used to wash the object to be coated in the post-electrodeposition rinse section, and
the wash water recycling line feeds, to the post-chemical-conversion rinse section, the wash water after being subjected to the filtration process in the filtration process apparatus as wash water to be used to wash the object to be coated in the post-chemical-conversion rinse section.

In this configuration (see FIG. 2), the wash water W after being used to wash the object to be coated after the object is subjected to electrodeposition coating in the post-electrodeposition rinse section F is subjected to a filtration process by the filtration process apparatus 4.

The wash water W subjected to the filtration process by the filtration process apparatus 4 is then fed to the post-chemical-conversion rinse section D through the wash water recycling line 5, and is used to wash an object to be coated after being subjected to the chemical conversion process in the post-chemical-conversion rinse section D.

Here, the wash water W after being used to wash the object to be coated after being subjected to electrodeposition coating in the post-electrodeposition rinse section F contains an electrodeposition solution (i.e. an electrodeposition solution used in electrodeposition coating of the object to be coated) that has been attached to the object to be coated after being subjected to electrodeposition coating.

However, the object to be coated that has been washed in the post-chemical-conversion rinse section D comes, in the next step, into contact with the electrodeposition solution in the electrodeposition coating section F in any case.

Accordingly, even if the wash water W to be used in the post-chemical-conversion rinse section D contains a small amount of electrodeposition solution, the conversion film formed on the surface of the object to be coated through the chemical conversion process in the previous step and the conversion solution that is attached to the object to be coated after being subjected to the chemical conversion process will not cause inconvenient chemical reaction with the electrodeposition solution contained in the wash water W.

For this reason, even if the wash water W after being used in the post-electrodeposition rinse section F is reused in the post-chemical-conversion rinse section D, the coating quality will not be degraded as long as foreign substances (e.g. coagulation, dust etc.) other than the electrodeposition solution that are contained in the wash water W after being used in the post-electrodeposition rinse section F are removed from the wash water W through a simple filtration process.

That is to say, according to the above configuration, by merely requiring a simple filtration process apparatus 4 it is possible to eliminate the need for an electrolytic water treatment apparatus and reduce the cost of the facility and the cost of running the facility.

In addition, the wash water W after being used in the post-electrodeposition rinse section F can be reused without degrading the coating quality.

Accordingly, the amount of wash water W to be consumed in the entire facility and the amount of used wash water W to be discharged that requires post-treatment can be reduced effectively.

A second characteristic configuration of the present invention specifies a preferable embodiment for carrying out the first characteristic configuration, and the characteristics thereof lie in the electrodeposition coating facility further including:
a fresh wash water mixing line,
wherein the fresh wash water mixing line mixes, with fresh wash water, the wash water after being subjected to the filtration process that is to be fed to the post-chemical-conversion rinse section through the wash water recycling line.

That is to say, even if the wash water after being used to wash the object to be coated in the post-electrodeposition rinse section is subjected to the filtration process by the filtration process apparatus, impurities remain in the wash water after being subjected to the filtration process, and thus a decrease in the water quality of the wash water to some extent is unavoidable.

In contrast, in the above configuration (see FIG. 4), the fresh wash water W is mixed, through the fresh wash water mixing line 6, with the wash water W after being subjected to the filtration process.

The mixture of this fresh wash water W allows the water quality of the wash water W to be used to wash the object to be coated 1 in the post-chemical-conversion rinse section D to be kept high.

Accordingly, inconvenience (e.g. coagulation of a small amount of electrodeposition solution etc.) that may occur in the post-chemical-conversion rinse section D due to a decrease in the water quality of the wash water W can be also avoided reliably, and thus the coating quality can be kept more reliably.

A third characteristic configuration of the present invention specifies a preferable embodiment for carrying out the first or second characteristic configuration, and the characteristics thereof lie in the electrodeposition coating facility further including:
an electrolytic water treatment apparatus; and
a secondary wash water recycling line,
wherein the electrolytic water treatment apparatus performs an electrolysis process on wash water after being used to wash the object to be coated in the post-chemical-conversion rinse section, and separates contaminants generated in the wash water due to the electrolysis process from the wash water, and the secondary wash water recycling line feeds, to the post-degreasing rinse section, the wash water from which the contaminants have been separated in the electrolytic water treatment apparatus as wash water to be used to wash the object to be coated in the post-degreasing rinse section.

This configuration (see FIG. 6) requires the electrolytic water treatment apparatus 7.

However, the cost of the facility and the cost of running the facility can be reduced compared with the case of providing both an electrolytic water treatment apparatus for treating the wash water W after being used in the post-electrodeposition rinse section F and an electrolytic water treatment apparatus for treating the wash water W after being used in the post-chemical-conversion rinse section D.

Also, in the above configuration, the wash water W after being used in the post-electrodeposition rinse section F is reused in the post-chemical-conversion rinse section D, and, in addition, the wash water W after being reused in the post-chemical-conversion rinse section D is reused again in the post-degreasing rinse section B.

Accordingly, the amount of wash water W to be consumed in the entire facility and the amount of used wash water W to be discharged that requires post-treatment can be further reduced effectively.

A fourth characteristic configuration of the present invention specifies a preferable embodiment for carrying out the first or second characteristic configuration, and the characteristics thereof lie in the electrodeposition coating facility further including:
an electrolytic water treatment apparatus; and
a concurrent wash water recycling line,
wherein a part of the wash water after being used to wash the object to be coated in the post-electrodeposition rinse section is fed to the post-chemical-conversion rinse section through the filtration process apparatus and the wash water recycling line,
the electrolytic water treatment apparatus performs an electrolysis process on another part of the wash water after being used to wash the object to be coated in the post-electrodeposition rinse section, and separates contaminants generated in the wash water due to the electrolysis process from the wash water, and
the concurrent wash water recycling line feeds, to the post-degreasing rinse section, the wash water from which the contaminants have been separated in the electrolytic water treatment apparatus as wash water to be used to wash the object to be coated in the post-degreasing rinse section.

This configuration (see FIG. 7) requires the electrolytic water treatment apparatus 7, similarly to the above-described third characteristic configuration.

However, the cost of the facility and the cost of running the facility can be reduced compared with the case of providing both an electrolytic water treatment apparatus for treating the wash water W to be fed from the post-electrodeposition rinse section F to the post-chemical-conversion rinse section D and an electrolytic water treatment apparatus for treating the wash water W to be fed from the post-electrodeposition rinse section F to the post-degreasing rinse section B.

Also, the wash water W after being used in the post-electrodeposition rinse section F is reused in the post-chemical-conversion rinse section D and the post-degreasing rinse section B.

Accordingly, the amount of wash water W to be consumed in the entire facility and the amount of used wash water W to be discharged that requires post-treatment can be reduced effectively, also similarly to the above-described third characteristic configuration.

In addition, in this configuration, the wash water W to be treated in the electrolytic water treatment apparatus 7 has been only used in the post-electrodeposition rinse section F.

Accordingly, the load on the electrolytic water treatment apparatus 7 can be lessened compared with the case where the electrolytic water treatment apparatus 7 treats the wash water W after being also used in the post-chemical-conversion rinse section D subsequently to the post-electrodeposition rinse section F.

The the cost of the facility and the cost of running the facility can be reduced more effectively for the amount by which the load is thus lessened, and the rinsing effect in the post-degreasing rinse section B can also be increased to further increase the coating quality.

A fifth characteristic configuration of the present invention specifies a preferable embodiment for carrying out the fourth characteristic configuration, and the characteristics thereof lie in that the post-electrodeposition rinse section is provided with a former-stage post-electrodeposition rinse section and a latter-stage post-electrodeposition rinse section, in the former-stage post-electrodeposition rinse section, the object to be coated that has been subjected to electrodeposition coating in the electrodeposition coating section is washed with wash water,
in the latter-stage post-electrodeposition rinse section, the object to be coated that has been washed in the former-stage post-electrodeposition rinse section is washed with wash water,
wash water after being used to wash the object to be coated in the former-stage post-electrodeposition rinse section is fed to the post-chemical-conversion rinse section through the filtration process apparatus and the wash water recycling line, and
wash water after being used to wash the object to be coated in the latter-stage post-electrodeposition rinse section is fed to the post-degreasing rinse section through the electrolytic water treatment apparatus and the concurrent wash water recycling line.

According to this configuration, the load on the electrolytic water treatment apparatus can be lessened more effectively.

That is to say (see FIG. 7), in the latter-stage post-electrodeposition rinse section F3, the object to be coated that has been washed in the former-stage post-electrodeposition rinse section F2 is washed.

Accordingly, the wash water W after being used to wash the object to be coated in the latter-stage post-electrodeposition rinse section F3 contains a smaller amount of contaminated substances than the wash water W after being used to wash the object to be coated in the former-stage post-electrodeposition rinse section F2.

For this reason, according to the above configuration in which the electrolytic water treatment apparatus 7 treats the wash water W that has been used in the latter-stage post-electrodeposition rinse section F3, the load on the electrolytic water treatment apparatus 7 can be lessened more effectively.

Furthermore, the cost of the facility and the cost of running the facility can be further reduced for the amount by which the load is thus lessened, and the rinsing effect in the post-degreasing rinse section B can be further increased.

BEST MODE FOR CARRYING OUT THE INVENTION

First Embodiment

Figure 1:
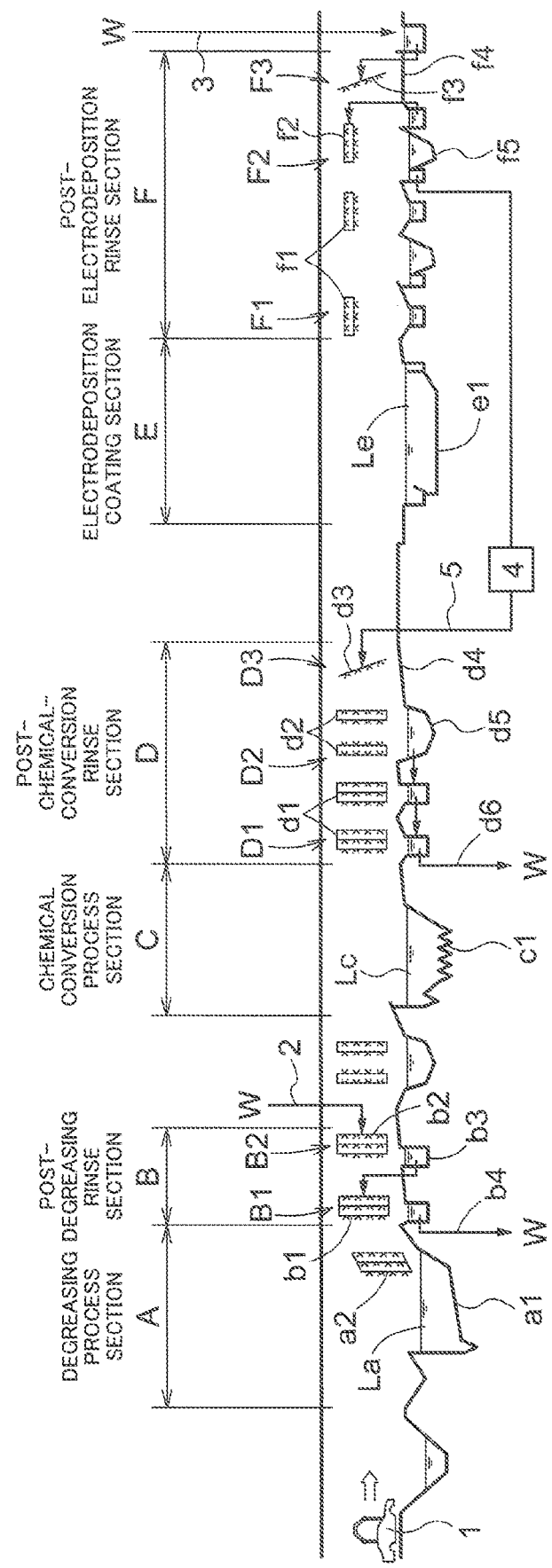
FIG. 1 is a facility structure diagram that illustrates an electrodeposition coating facility according to a first embodiment.
Figure 2:
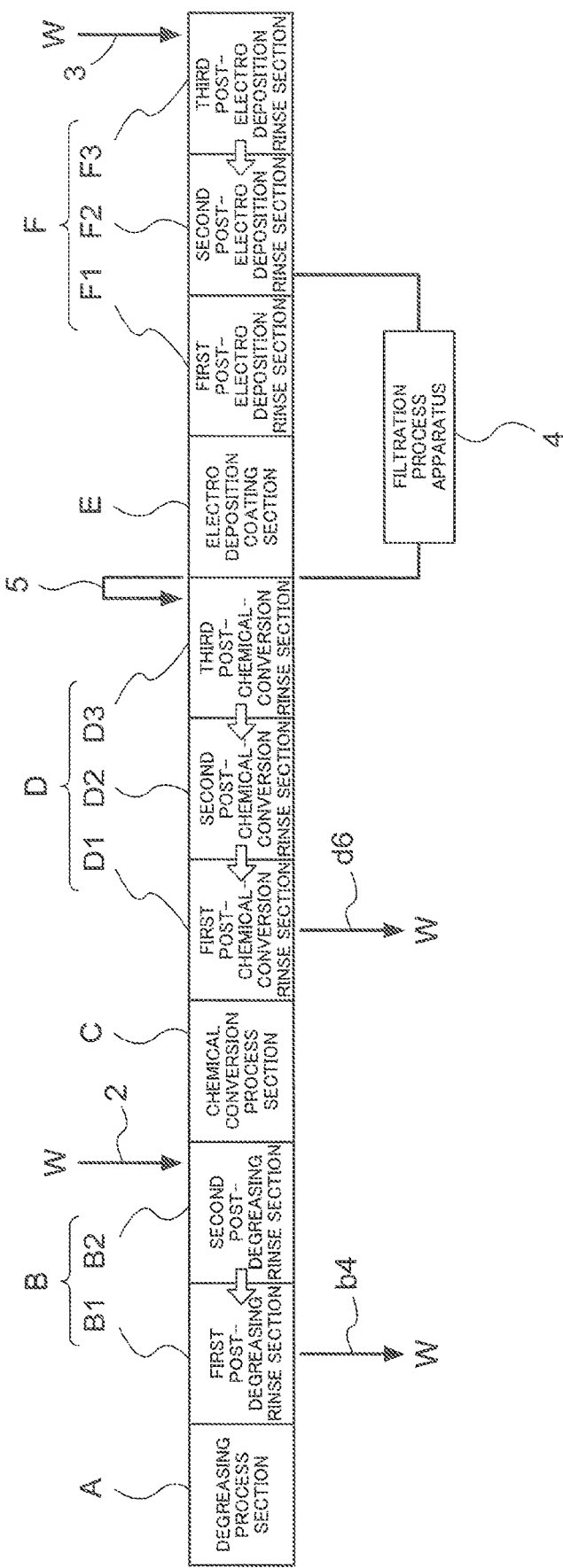
FIG. 2 is a block diagram that illustrates the electrodeposition coating facility according to the first embodiment.

FIGS. 1 and 2 are a facility structure diagram and a block diagram, respectively, that illustrate an electrodeposition coating facility according to the first embodiment. In the electrodeposition coating facility according to the first embodiment, a degreasing process section A, a post-degreasing rinse section B, a chemical conversion process section C, a post-chemical-conversion rinse section D, an electrodeposition coating section E, and a post-electrodeposition rinse section F are arranged in that order from the upstream side in a direction in which an object to be coated 1 (which is an automobile body in this example) is conveyed.

In the degreasing process section A, the object to be coated 1 is dipped into a degreasing solution La in a degreasing bath a1.

Also, in the degreasing process section A, the degreasing solution La is sprayed onto the object to be coated 1 by a shower apparatus a2.

The object to be coated 1 is subjected to a degreasing process in the degreasing process section A as a result of coming into contact with the degreasing solution La due to the aforementioned dipping and spraying.

That is to say, oil that is attached to the surface of the object to be coated 1 is removed through this degreasing process.

The post-degreasing rinse section B is constituted by a first post-degreasing rinse section B1 and a second post-degreasing rinse section B2.

In the first post-degreasing rinse section B1, wash water W is sprayed, by a shower apparatus b1, over the object to be coated 1 after being subjected to the degreasing process in the degreasing process section A.

Thus, in the first post-degreasing rinse section B1, the object to be coated 1 after being subjected to the degreasing process in the degreasing process section A is washed with the wash water W.

In the second post-degreasing rinse section B2, the wash water W is sprayed, by a shower apparatus b2, over the object to be coated 1 after being washed in the first post-degreasing rinse section B1.

Thus, in the second post-degreasing rinse section B2, the object to be coated 1 after being washed in the first post-degreasing rinse section B1 is further washed with the wash water W.

The shower apparatus b2 in the second post-degreasing rinse section B2 is supplied with fresh wash water W (which is fresh industrial water in this example) through a fresh wash water line 2.

Thus, in the second post-degreasing rinse section B2, the object to be coated 1 is washed using the fresh wash water W (fresh industrial water).

Meanwhile, the wash water W (industrial water) after being used to wash the object to be coated 1 in the second post-degreasing rinse section B2 is fed to the shower apparatus b1 in the first post-degreasing rinse section B1 through a collection tank b3.

Thus, the wash water W (industrial water) after being used to wash the object to be coated 1 in the second post-degreasing rinse section B2 is used again to wash the object to be coated 1 in the first post-degreasing rinse section B1 in the former stage.

Then, the wash water W after being used to wash the object to be coated 1 in the first post-degreasing rinse section B1 is discharged to the outside through a drain line b4.

In the chemical conversion process section C, the object to be coated 1 after being washed in the post-degreasing rinse section B is dipped into a conversion solution Lc in a conversion bath c1.

The object to be coated 1 after being washed in the post-degreasing rinse section B is subjected to a chemical conversion process by coming into contact with the conversion solution Lc due to the dipping.

As a result of the chemical conversion process, a conversion layer is formed on the surface of the object to be coated 1.

The post-chemical-conversion rinse section D is constituted by first to third post-chemical-conversion rinse sections D1 to D3.

In the first post-chemical-conversion rinse section D1, the wash water W is sprayed, by shower apparatuses d1, over the object to be coated 1 after being subjected to the chemical conversion process in the chemical conversion process section C.

Thus, in the first post-chemical-conversion rinse section D1, the object to be coated 1 after being subjected to the chemical conversion process in the chemical conversion process section C is washed with the wash water W.

In the second post-chemical-conversion rinse section D2, the wash water W is sprayed, by shower apparatuses d2, over the object to be coated 1 after being washed in the first post-chemical-conversion rinse section D1.

Thus, in the second post-chemical-conversion rinse section D2, the object to be coated 1 after being washed in the first post-chemical-conversion rinse section D1 is further washed with the wash water W.

Furthermore, in the third post-chemical-conversion rinse section D3, the wash water W is sprayed, by a shower apparatus d3, over the object to be coated 1 after being washed in the second post-chemical-conversion rinse section D2.

Thus, in the third post-chemical-conversion rinse section D3, the object to be coated 1 after being washed in the second post-chemical-conversion rinse section D2 is further washed with the wash water W.

The wash water W after being used to wash the object to be coated 1 in the third post-chemical-conversion rinse section D3 is fed to the shower apparatuses d2 in the second post-chemical-conversion rinse section D2 through a collection tank d4.

Thus, the wash water W after being used to wash the object to be coated 1 in the third post-chemical-conversion rinse section D3 is used again to wash the object to be coated 1 in the second post-chemical-conversion rinse section D2 in the former stage.

Also, the wash water W after being used to wash the object to be coated 1 in the second post-chemical-conversion rinse section D2 is fed to the shower apparatus d1 in the first post-chemical-conversion rinse section D1 through a collection tank d5.

Thus, the wash water W after being used to wash the object to be coated 1 in the second post-chemical-conversion rinse section D2 is further used again to wash the object to be coated 1 in the first post-chemical-conversion rinse section D1 in the former stage.

The wash water W after being used to wash the object to be coated 1 in the first post-chemical-conversion rinse section D1 is discharged to the outside through a drain line d6.

In the electrodeposition coating section E, the object to be coated 1 after being washed in the post-chemical-conversion rinse section D is clipped into an electrodeposition solution Le in an electrodeposition bath e1 in which current flows.

As a result of the object to be coated 1 coming into contact with the electrodeposition solution Le due to the dipping while current flows, paint components in the electrodeposition solution Le accumulate and a coating film is formed on the surface of the object to be coated 1 after being washed in the post-chemical-conversion rinse section D.

That is to say, in the electrodeposition coating section E, electrodeposition coating, which serves as undercoating, is performed on the object to be coated 1 after being washed in the post-chemical-conversion rinse section D.

The post-electrodeposition rinse section F is constituted by first to third post-electrodeposition rinse sections F1 to F3.

In the first post-electrodeposition rinse section F1, the wash water W is sprayed, by shower apparatuses f1, over the object to be coated 1 after being subjected to electrodeposition coating in the electrodeposition coating section E.

Thus, in the first post-electrodeposition rinse section F1, the object to be coated 1 after being subjected to electrodeposition coating in the electrodeposition coating section E is washed with the wash water W.

In the first post-electrodeposition rinse section F1, the wash water W is purified by an ultrafiltration process apparatus and is repeatedly used to wash objects to be coated 1.

The second post-electrodeposition rinse section F2 is a former-stage post-electrodeposition rinse section in a final post-electrodeposition rinse section.

In the second post-electrodeposition rinse section F2, the wash water W is sprayed, by a shower apparatus f2, over the object to be coated 1 after being washed in the first post-electrodeposition rinse section F1.

Thus, in the second post-electrodeposition rinse section F2, the object to be coated 1 after being washed in the first post-electrodeposition rinse section F1 is further washed with the wash water W.

The third post-electrodeposition rinse section F3 is a latter-stage post-electrodeposition rinse section in the final post-electrodeposition rinse section.

In the third post-electrodeposition rinse section F3, the wash water W is sprayed, by a shower apparatus f3, over the object to be coated 1 after being washed in the second post-electrodeposition rinse section F2.

Thus, in the third post-electrodeposition rinse section F3, the object to be coated 1 after being washed in the second post-electrodeposition rinse section F2 is further washed again with the wash water W.

The object to be coated 1 after being subjected to electrodeposition coating and washed in the post-electrodeposition rinse section F is then subjected to an intercoating process, a topcoating process, and a drying process in that order, and the coating is thus finished.

The shower apparatus f3 in the third post-electrodeposition rinse section F3 is supplied with fresh wash water W (which is fresh pure water in this example) through a fresh wash water line 3.

Thus, in the third post-electrodeposition rinse section F3, which serves as the latter-stage post-electrodeposition rinse section, the object to be coated 1 is washed using the fresh wash water W (fresh pure water).

Meanwhile, the wash water W (pure water) after being used to wash the object to be coated 1 in the third post-electrodeposition rinse section F3 is fed to the shower apparatus f2 in the second post-electrodeposition rinse section F2 through a collection tank f4.

Thus, the wash water W (pure water) after being used to wash the object to be coated 1 in the third post-electrodeposition rinse section F3 is used again to wash the object to be coated 1 in the second post-electrodeposition rinse section F2 in the former stage.

The wash water W (pure water) that has been used to wash the object to be coated 1 in the second post-electrodeposition rinse section F2, which serves as the former-stage post-electrodeposition rinse section, is fed to a simple filtration process apparatus 4 through a collection tank f5.

In this filtration process apparatus 4, the wash water W (pure water) that is fed from the collection tank f5 in the second post-electrodeposition rinse section F2 is subjected to a filtration process.

That is to say, solids contained in the wash water W (pure water) are separated and removed from the wash water W through this filtration process.

That is to say, the wash water W that has been used to wash the object to be coated 1 in the second and third post-electrodeposition rinse sections F2 and F3 contains solids, such as refuse that is contained in the electrodeposition solution Le and has been attached to the object to be coated 1 after being subjected to the electrodeposition coating.

However, only the solids in the wash water W are separated and removed from the wash water W in the filtration process apparatus 4.

The wash water W (pure water) after being subjected to the filtration process from which solids have been removed in the simple filtration process apparatus 4 is fed to the shower apparatus d3 in the third post-chemical-conversion rinse section D3 through a wash water recycling line 5, which extends from the filtration process apparatus 4 to the third post-chemical-conversion rinse section D3.

That is to say, solids such as refuse contained in the wash water W are removed from the wash water W (pure water) after being used to wash the object to be coated 1 after being subjected to electrodeposition coating in the third and second post-electrodeposition rinse sections F3 and F2, through the filtration process in the filtration process apparatus 4.

After this filtration process, the wash water W is used again to wash the object to be coated 1 in the post-chemical-conversion rinse section D.

By thus reusing the wash water W, the amount of wash water W to be consumed in the entire facility and the amount of used wash water W to be discharged that requires post-treatment are reduced effectively.

Second Embodiment

Figure 3:
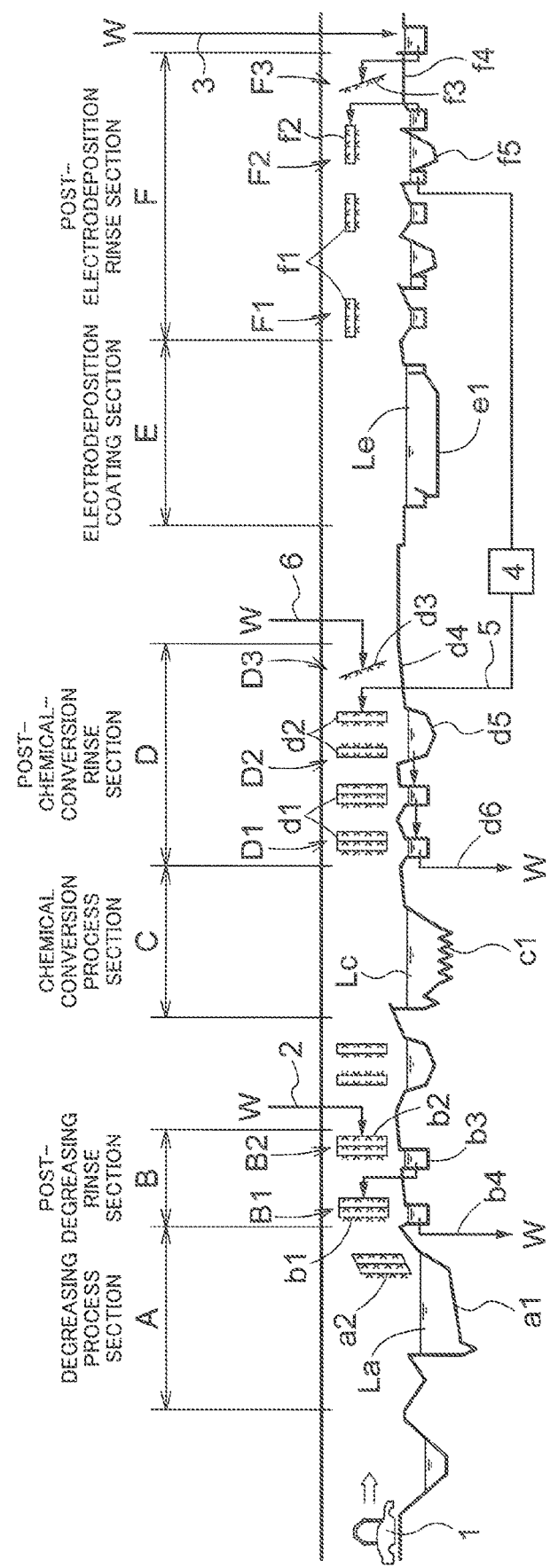
FIG. 3 is a facility structure diagram that illustrates an electrodeposition coating facility according to a second embodiment.
Figure 4:
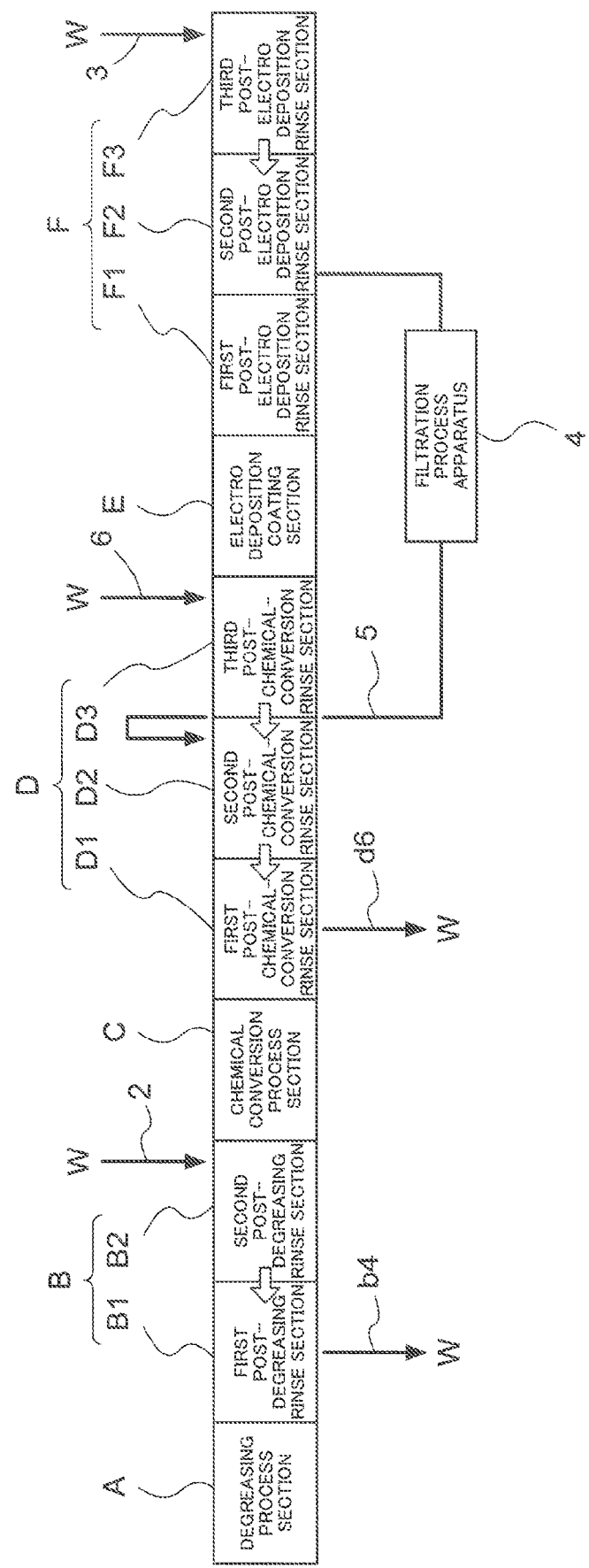
FIG. 4 is a block diagram that illustrates the electrodeposition coating facility according to the second embodiment.

FIGS. 3 and 4 are a facility structure diagram and a block diagram, respectively, that illustrate an electrodeposition coating facility according to the second embodiment.

In the electrodeposition coating facility according to the second embodiment, the wash water W (pure water) after being used to wash the object to be coated 1 after being subjected to electrodeposition coating in the third and second post-electrodeposition rinse sections F3 and F2 is subjected to the filtration process in the filtration process apparatus 4, and is then fed to the shower apparatus d2 in the second post-chemical-conversion rinse section D2 through the wash water recycling line 5.

Also, fresh wash water W (which is fresh pure water in this example) is fed to the shower apparatus d3 in the third post-chemical-conversion rinse section D3 through a fresh wash water mixing line 6.

The wash water W (pure water) after being used to wash the object to be coated 1 in the third post-chemical-conversion rinse section D3 is fed to the shower apparatuses d2 in the second post-chemical-conversion rinse section D2 through the collection tanks d4 and d5.

When being thus fed, the wash water W (pure water) after being used to wash the object to be coated 1 in the third post-chemical-conversion rinse section D3 is mixed with the wash water W after being subjected to the filtration process that is fed through the wash water recycling line 5.

That is to say, even if the wash water W after being used to wash the object to be coated 1 in the post-electrodeposition rinse section F is subjected to the filtration process by the filtration process apparatus 4, a certain amount of impurities remain in the wash water W after being subjected to the filtration process, and it is therefore unavoidable that the water quality of the wash water W decreases to some extent.

However, as a result of the wash water W after being subjected to the filtration process being mixed with the fresh wash water W as mentioned above, the water quality of the wash water W to be used to wash the object to be coated 1 in the post-chemical-conversion rinse section D is reliably kept high.

Other features are the same as those of the electrodeposition coating facility according to the first embodiment.

Note that, in the second embodiment, the wash water W after being subjected to the filtration process that is fed through the wash water recycling line 5 is mixed with the fresh wash water W supplied from the fresh wash water mixing line 6 in the second post-chemical-conversion rinse section D2.

Figure 5:
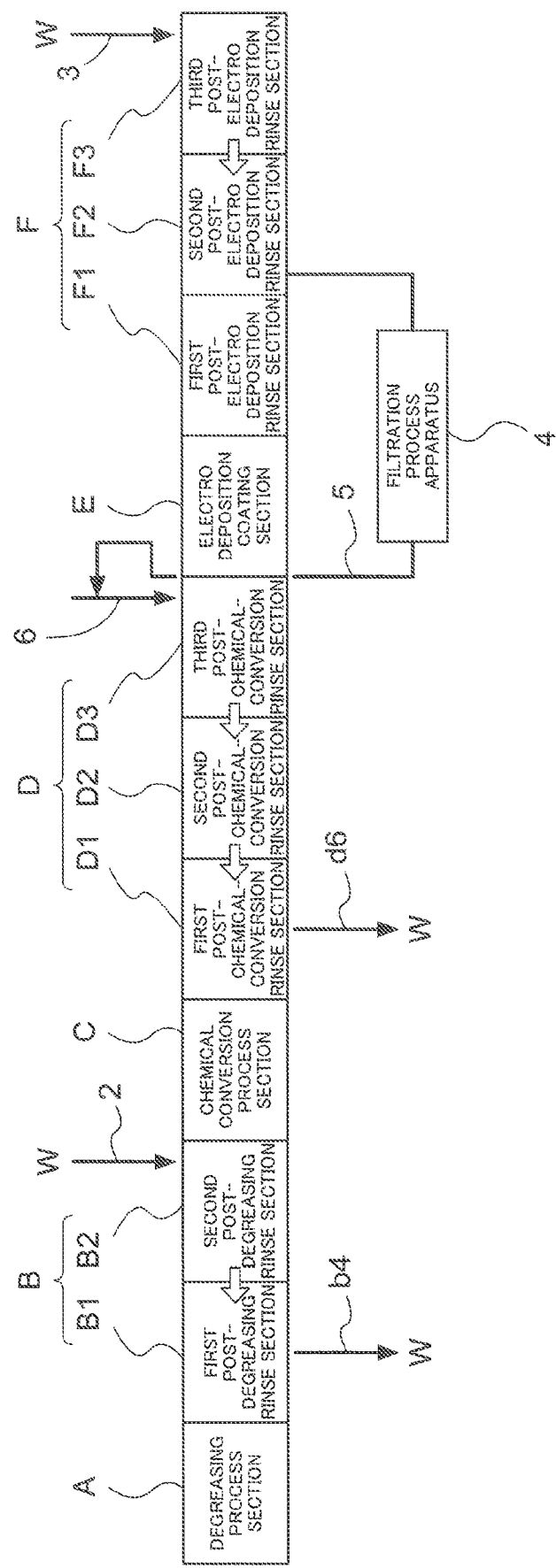
FIG. 5 is a block diagram of a facility in which a part of the electrodeposition coating facility according to the second embodiment has been modified.

However, alternatively, both wash water W may be fed to the post-chemical-conversion rinse section D after being mixed, as shown in FIG. 5.

Third Embodiment

Figure 6:
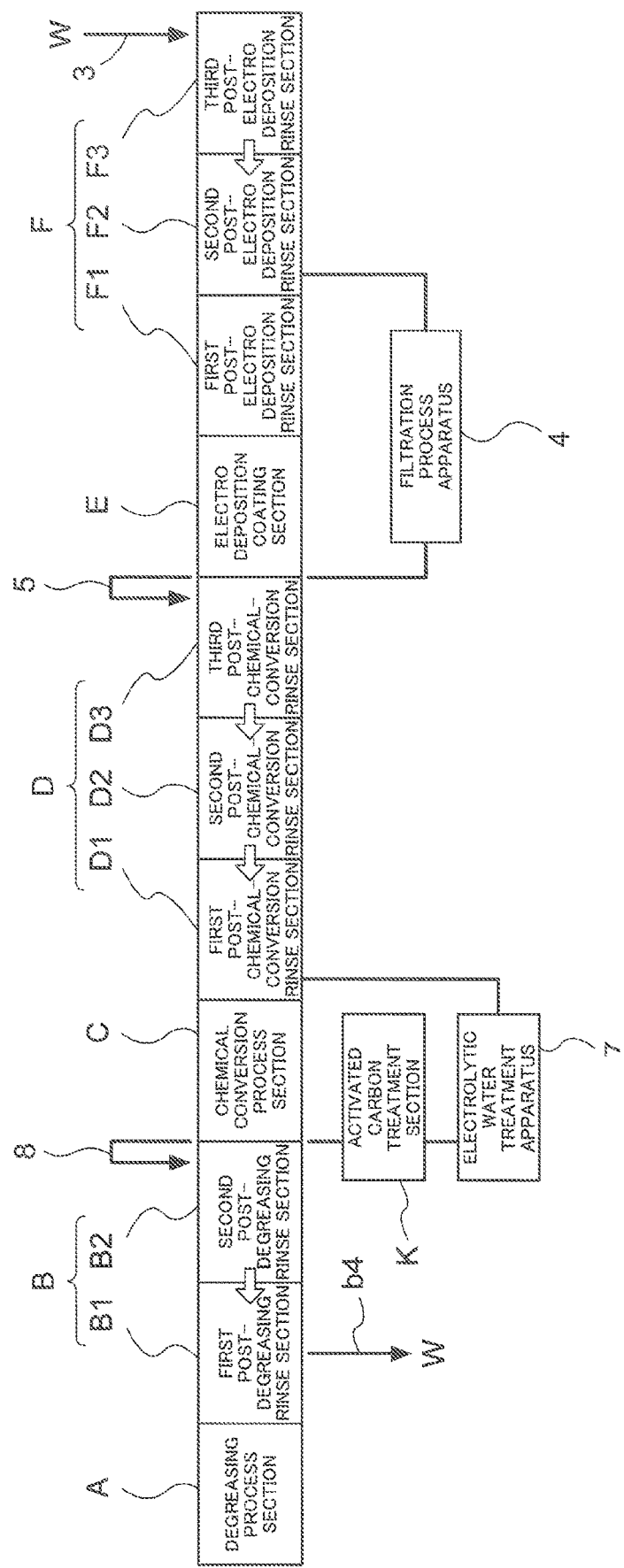
FIG. 6 is a block diagram that illustrates an electrodeposition coating facility according to a third embodiment.

FIG. 6 is a block diagram that illustrates an electrodeposition coating facility according to the third embodiment.

In the electrodeposition coating facility according to the third embodiment, the wash water W after being used to wash the object to be coated 1 in the first post-chemical-conversion rinse section D1 is fed to an electrolytic water treatment apparatus 7.

In the electrolytic water treatment apparatus 7, the wash water W after being used to wash the object to be coated 1 in the first post-chemical-conversion rinse section D1 is subjected to an electrolysis process.

Also, in the electrolytic water treatment apparatus 7, contaminants generated in the wash water W due to the electrolysis process (i.e. substances generated by reaction of various ion components in the wash water VV) are separated from the wash water W.

The wash water W from which contaminants have been separated in the electrolytic water treatment apparatus 7 is fed to the shower apparatus b2 in the second post-degreasing rinse section B2 through a secondary wash water recycling line 8.

Thus, in the post-degreasing rinse section B, the object to be coated 1 is washed with the wash water W from which contaminants have been removed by the electrolytic water treatment apparatus 7.

That is to say, in the electrodeposition coating facility according to the third embodiment, the wash water W that has been subjected to the filtration process in the filtration process apparatus 4 and then used to wash the object to be coated 1 in the post-chemical-conversion rinse section D is further treated in the electrolytic water treatment apparatus 7, and is then used yet again to wash the object to be coated 1 in the post-degreasing rinse section B.

Accordingly, the amount of wash water W to be consumed in the entire facility and the amount of used wash water W to be discharged that requires post-treatment are reduced more effectively.

Note that an activated carbon treatment section K is provided after the electrolytic water treatment apparatus 7.

In the activated carbon treatment section K, the wash water W that has been treated in the electrolytic water treatment apparatus 7 is treated by being brought into contact with activated carbon.

To keep higher treatment quality of the object to be coated 1 in the chemical conversion process section C, it is desirable to arrange the activated carbon treatment section K after the electrolytic water treatment apparatus 7.

The other features are the same as those of the electrodeposition coating facility according to the first embodiment.

Figure 9:
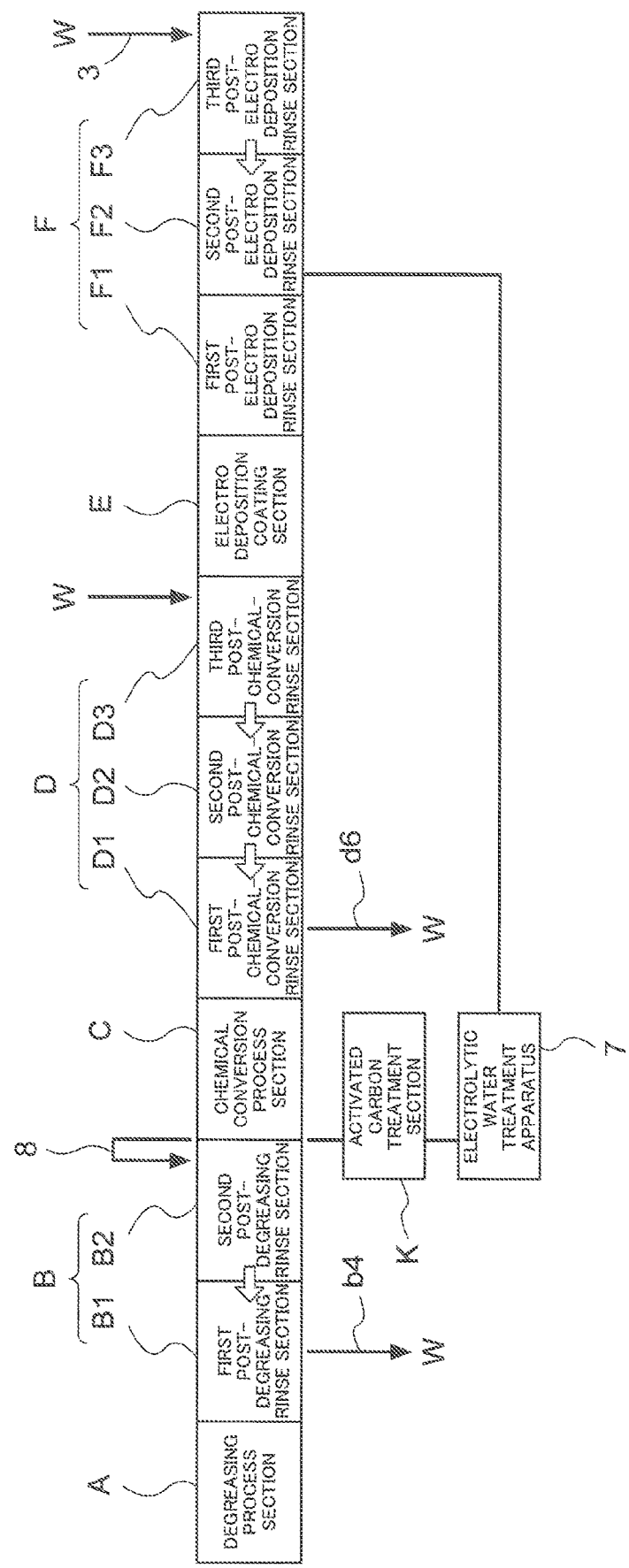
FIG. 9 is a block diagram that illustrates an electrodeposition coating facility in a comparative example.

Note that FIG. 9 is a block diagram that illustrates an electrodeposition coating facility according to a comparative example.

In the electrodeposition coating facility according to the comparative example shown in FIG. 9, the wash water W (pure water) after being used to wash the object to be coated 1 in the second post-electrodeposition rinse section F2 is fed to the electrolytic water treatment apparatus 7.

In this electrolytic water treatment apparatus 7, the wash water W (pure water) after being used to wash the object to be coated 1 in the second post-electrodeposition rinse section F2 is subjected to an electrolysis process.

Also, in the electrolytic water treatment apparatus 7, contaminants generated in the wash water W due to the electrolysis process, as well as paint components, dust, and the like in the electrodeposition solution Le that have been attached to the object to be coated 1 after being subjected to electrodeposition coating are separated and removed from the wash water W.

The wash water W from which contaminants, paint components, dust, and the like have been separated and removed in the electrolytic water treatment apparatus 7 passes through the activated carbon treatment section K and is then fed to the shower apparatus b2 in the second post-degreasing rinse section B2, and is used to wash the object to be coated 1 in the post-degreasing rinse section B.

The wash water W that has been used to wash the object to be coated 1 in the post-chemical-conversion rinse section D is discharged to the outside through the drain line d6.

When the electrodeposition coating facility according to the comparative example is compared with the electrodeposition coating facility according to the third embodiment, both facilities are equipped with only one electrolytic water treatment apparatus 7, which is complex and expensive.

However, in the electrodeposition coating facility according to the third embodiment, the amount of wash water W to be consumed in the entire facility and the amount of used wash water W to be discharged that requires post-treatment are obviously reduced more significantly than those in the electrodeposition coating facility according to the comparative example, as a result of merely adding the filtration process apparatus 4 that is more simple and inexpensive than the electrolytic water treatment apparatus 7.

Fourth Embodiment

Figure 7:
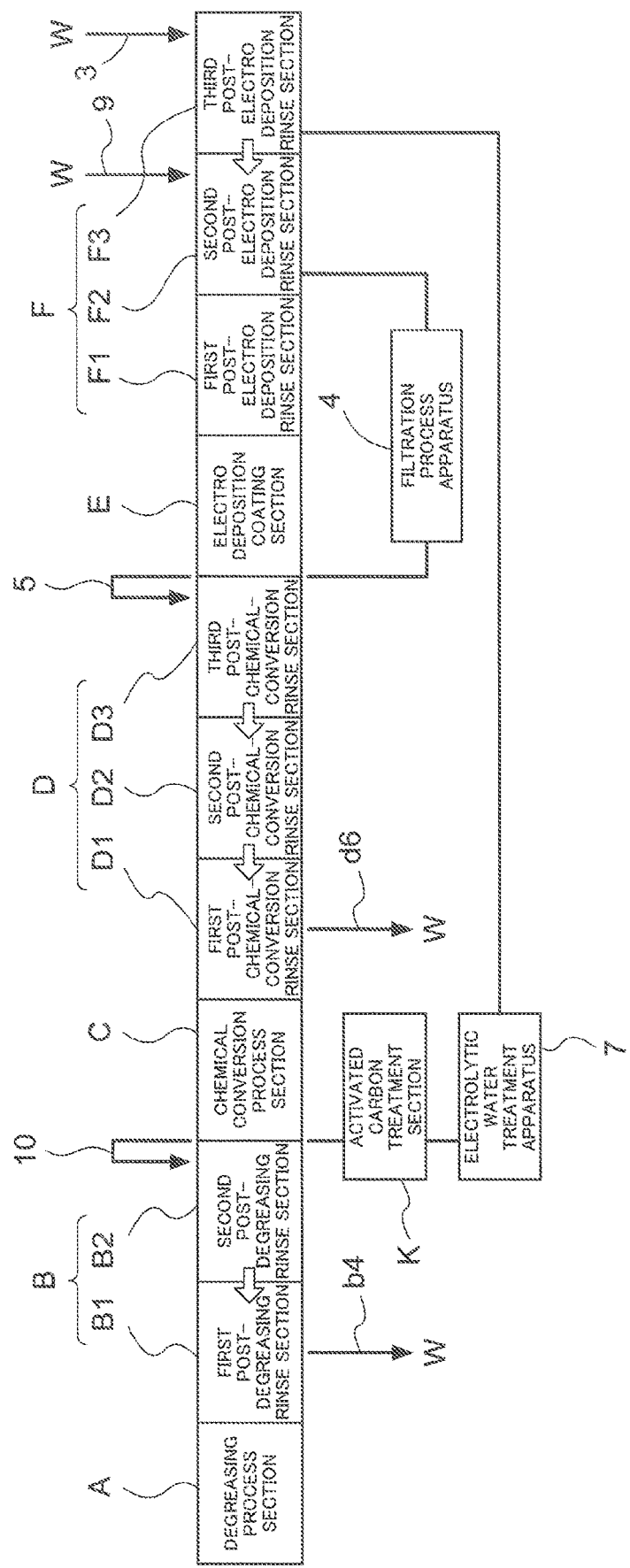
FIG. 7 is a block diagram that illustrates an electrodeposition coating facility according to a fourth embodiment.

FIG. 7 is a block diagram that illustrates an electrodeposition coating facility according to the fourth embodiment.

In the electrodeposition coating facility according to the fourth embodiment, a part of the wash water W (pure water) after being used to wash the object to be coated 1 in the third post-electrodeposition rinse section F3 is mixed with fresh wash water W (fresh pure water) that is supplied through a second fresh wash water line 9.

After being mixed, this wash water W is fed to the shower apparatus f2 in the second post-electrodeposition rinse section F2.

Also, as a part of the wash water W after being used to wash the object to be coated 1 after being subjected to electrodeposition coating in the post-electrodeposition rinse section F, the wash water W after being used to wash the object to be coated 1 in the second post-electrodeposition rinse section F2 is fed to the shower apparatus d3 in the third post-chemical-conversion rinse section D3 through the filtration process apparatus 4 and the wash water recycling line 5.

Meanwhile, as the other part of the wash water W after being used to wash the object to be coated 1 after being subjected to electrodeposition coating in the post-electrodeposition rinse section F, the remainder of the wash water W after being used to wash the object to be coated 1 in the third post-electrodeposition rinse section F3 is fed to the electrolytic water treatment apparatus 7.

In the electrolytic water treatment apparatus 7, the remainder of the wash water W after being used to wash the object to be coated 1 in the third post-electrodeposition rinse section F3 is subjected to the electrolysis process.

Also, in the electrolytic water treatment apparatus 7, contaminants generated in the wash water W due to the electrolysis process, as well as paint components, dust, and the like are separated and removed from the wash water W.

The wash water W from which contaminants, paint components, dust, and the like have been separated and removed in the electrolytic water treatment apparatus 7 passes through the activated carbon treatment section K and is then fed to the shower apparatus b2 in the second post-degreasing rinse section B2 through a concurrent wash water recycling line 10.

Thus, in the post-degreasing rinse section B, the object to be coated 1 is washed using the wash water W that has been treated by the electrolytic water treatment apparatus 7.

That is to say, in the electrodeposition coating facility according to the fourth embodiment, the wash water W after being used in the post-electrodeposition rinse section F is reused in the post-chemical-conversion rinse section D and the post-degreasing rinse section B.

Accordingly, the amount of wash water to be consumed in the entire facility and the cost required to treat used wash water are reduced effectively, similarly to the above-described electrodeposition coating facility according to the third embodiment.

Also, in the electrodeposition coating facility according to the fourth embodiment, the wash water W to be treated by the electrolytic water treatment apparatus 7 is the wash water that has been only used in the post-electrodeposition rinse section F.

Accordingly, the load on the electrolytic water treatment apparatus 7 can be lessened compared with the case where the electrolytic water treatment apparatus 7 also treats the wash water W that has also been used in the post-chemical-conversion rinse section D after being used in the post-electrodeposition rinse section F.

Furthermore, the cost of the facility and the cost of running the facility can be reduced for the amount by which the load is lessened.

Also, the rinsing effect in the post-degreasing rinse section B can also be increased, and the coating quality can be further increased.

Figure 8:
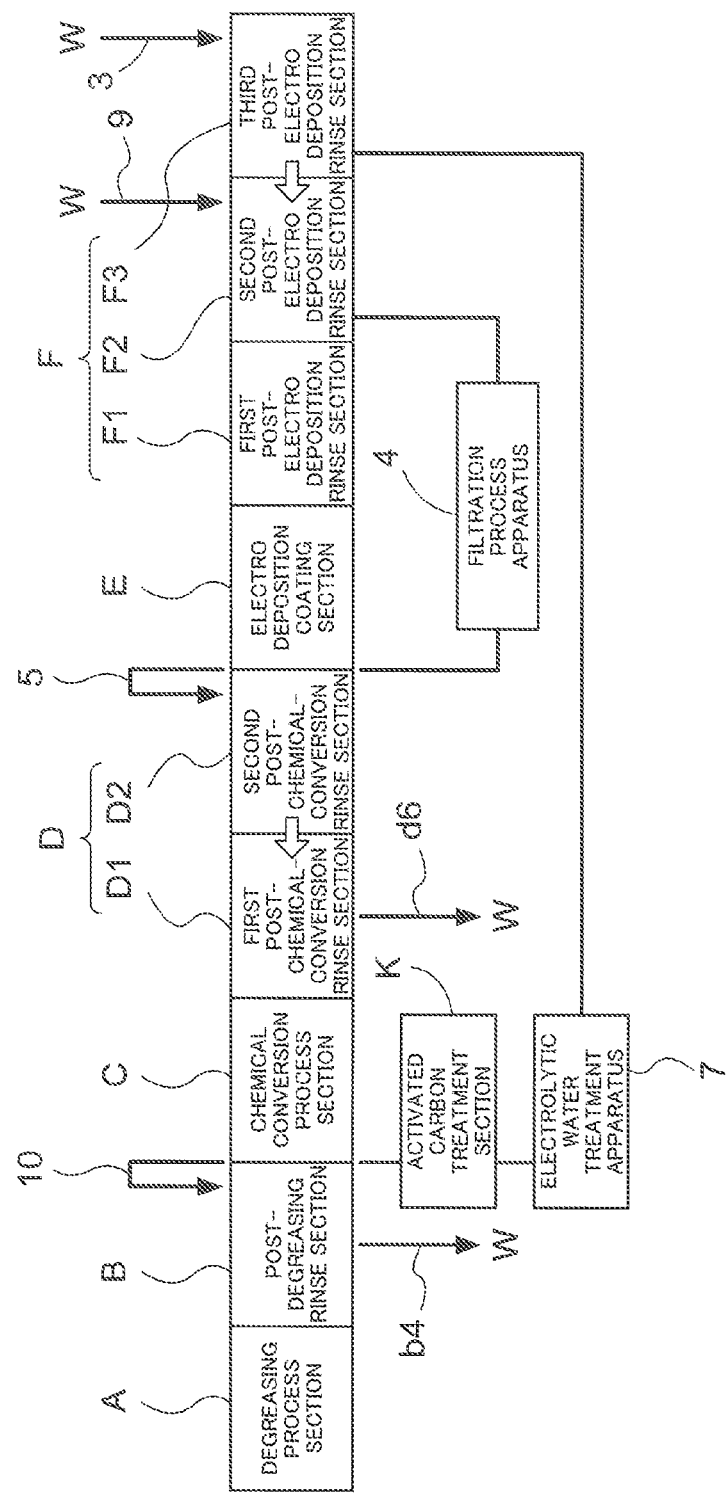
FIG. 8 shows blocks is a block diagram of a facility in which a part of the electrodeposition coating facility according to the fourth embodiment has been modified.

FIG. 8 is a block diagram of an electrodeposition coating facility, in which the electrodeposition coating facility according to the fourth embodiment is simplified.

The post-degreasing rinse section B in this electrodeposition coating facility is only provided with the first post-degreasing rinse section B1.

Also, the post-chemical-conversion rinse section D is only provided with the first and second post-chemical-conversion rinse sections D1 and D2.

The wash water W (pure water) that has been used to wash the object to be coated 1 in the second post-electrodeposition rinse section F2, which serves as the former-stage post-electrodeposition rinse section, is subjected to the filtration process in the filtration process apparatus 4.

Then, the wash water W from which solids such as paint components and dust have been separated and removed through the filtration process in the filtration process apparatus 4 is fed to the shower apparatus d2 in the second post-chemical-conversion rinse section D2 through the wash water recycling line 5.

That is to say, similarly to the above description, the wash water W (pure water) that has been used to wash the object to be coated 1 in the second post-electrodeposition rinse section F2 is subjected to the filtration process by the simple filtration process apparatus 4, and is then used again to wash the object to be coated 1 in the post-chemical-conversion rinse section D.

Meanwhile, the wash water W (pure water) that has been used to wash the object to be coated 1 in the third post-electrodeposition rinse section F3, which serves as the latter-stage post-electrodeposition rinse section, is treated in the electrolytic water treatment apparatus 7.

The wash water W from which contaminants have been separated and removed through the electrolysis process and separation process in the electrolytic water treatment apparatus 7 passes through the activated carbon treatment section K and is then fed to the shower apparatus b1 in the first post-degreasing rinse section B1 through the concurrent wash water recycling line 10.

That is to say, the wash water W (pure water) that has been used to wash the object to be coated 1 in the third post-electrodeposition rinse section F3 is treated by the electrolytic water treatment apparatus 7 and is then used again to wash the object to be coated in the post-degreasing rinse section B.

Other Embodiments

Next, other embodiments of the present invention will be listed.

The number of stages of rinse sections to be provided in each of the post-degreasing rinse section B, the post-chemical-conversion rinse section D, and the post-electrodeposition rinse section F is not limited to that described in the above embodiments, and may be changed in various ways.

The washing method for washing the object to be coated 1 using the wash water W, which may be a showering method, a dipping tank method, or the like, to be used in the washing section in each stage in the post-degreasing rinse section B, the post-chemical-conversion rinse section D, and the post-electrodeposition rinse section F is not limited to the washing method described in the above embodiments either, and may be changed in various manners.

To separate, from the wash water W, contaminants generated in the wash water W due to the electrolysis process performed thereon in the electrolytic water treatment apparatus 7, various separation methods may be employed, such as a gravity separation method in which contaminants are separated by surfacing or precipitating these substances, and a filtration method in which contaminants are separated using a filter.

Depending on the case, the activated carbon treatment section K provided after the electrolytic water treatment apparatus 7 may be omitted, or an alternative treatment section of the activated carbon treatment section K may be provided after the electrolytic water treatment apparatus 7.

The object to be coated 1 is not limited to an automobile body, and may be anything in various fields, such as automobile parts including a bumper, vehicles, casings for electrical products, and architectural materials.

INDUSTRIAL APPLICABILITY

The electrodeposition coating facility according to the present invention is applicable to electrodeposition coating of objects to be coated in various fields.

DESCRIPTION OF REFERENCE SIGNS

1: Object to be coated
La: Degreasing solution
A: Degreasing process section
W: Wash water
B: Post-degreasing rinse section
Lc: Conversion solution
C: Chemical conversion process section
D: Post-chemical-conversion rinse section
Le: Electrodeposition solution
E: Electrodeposition coating section
F: Post-electrodeposition rinse section
4: Filtration process apparatus
5: Wash water recycling line
6: Fresh wash water mixing line
7: Electrolytic water treatment apparatus
8: Secondary wash water recycling line
10: Concurrent wash water recycling line
F2: Second post-electrodeposition rinse section (former-stage post-electrodeposition rinse section)
F3: Third post-electrodeposition rinse section (latter-stage post-electrodeposition rinse section)

The invention claimed is:

1. An electrodeposition coating facility comprising:
a degreasing process section, wherein an object to be coated is subjected to a degreasing process using a degreasing solution;
a post-degreasing rinse section, wherein the object that has been processed in the degreasing process section is washed with wash water;
a chemical conversion process section, wherein the object that has been washed in the post-degreasing rinse section is subjected to a chemical conversion process using a conversion solution;
a post-chemical-conversion rinse section, wherein the object that has been processed in the chemical conversion process section is washed with wash water;
a electrodeposition coating section, wherein the object that has been washed in the post-chemical-conversion rinse section is subjected to electrodeposition coating using an electrodeposition solution;
a post-electrodeposition rinse section, wherein the object that has been subjected to electrodeposition coating in the electrodeposition coating section is washed with wash water;
a filtration process apparatus; and
a wash water recycling line,
wherein the filtration process apparatus performs a filtration process on wash water after being used to wash the object in the post-electrodeposition rinse section so as to separate and remove solids from the wash water, and
wherein the wash water recycling line directly feeds, to the post-chemical-conversion rinse section, the wash water after being subjected to the filtration process in the filtration process apparatus as wash water to be used to wash the object in the post-chemical-conversion rinse section.

2. The electrodeposition coating facility according to claim 1, further comprising:
a fresh wash water mixing line,
wherein the fresh wash water mixing line mixes, with fresh wash water, the wash water after being subjected to the filtration process that is to be fed to the post-chemical-conversion rinse section through the wash water recycling line.

3. The electrodeposition coating facility according to claim 2, further comprising:
an electrolytic water treatment apparatus; and
a secondary wash water recycling line,
wherein the electrolytic water treatment apparatus performs an electrolysis process on wash water after being used to wash the object in the post-chemical-conversion rinse section, and separates contaminants generated in the wash water due to the electrolysis process from the wash water, and
the secondary wash water recycling line feeds, to the post-degreasing rinse section, the wash water from which the contaminants have been separated in the electrolytic water treatment apparatus as wash water to be used to wash the object in the post-degreasing rinse section.

4. The electrodeposition coating facility according to claim 2, further comprising:
an electrolytic water treatment apparatus; and
a concurrent wash water recycling line,
wherein a part of the wash water after being used to wash the object in the post-electrodeposition rinse section is fed to the post-chemical-conversion rinse section through the filtration process apparatus and the wash water recycling line,
the electrolytic water treatment apparatus performs an electrolysis process on another part of the wash water after being used to wash the object in the post-electrodeposition rinse section, and separates contaminants generated in the wash water due to the electrolysis process from the wash water, and
the concurrent wash water recycling line feeds, to the post-degreasing rinse section, the wash water from which the contaminants have been separated in the electrolytic water treatment apparatus as wash water to be used to wash the object in the post-degreasing rinse section.

5. The electrodeposition coating facility according to claim 1, further comprising:

an electrolytic water treatment apparatus; and a secondary wash water recycling line, wherein the electrolytic water treatment apparatus performs an electrolysis process on wash water after being used to wash the object in the post-chemical-conversion rinse section, and separates contaminants generated in the wash water due to the electrolysis process from the wash water, and the secondary wash water recycling line feeds, to the post-degreasing rinse section, the wash water from which the contaminants have been separated in the electrolytic water treatment apparatus as wash water to be used to wash the object in the post-degreasing rinse section.

6. The electrodeposition coating facility according to claim 1, further comprising:

an electrolytic water treatment apparatus; and a concurrent wash water recycling line, wherein a part of the wash water after being used to wash the object in the post-electrodeposition rinse section is fed to the post-chemical-conversion rinse section through the filtration process apparatus and the wash water recycling line, the electrolytic water treatment apparatus performs an electrolysis process on another part of the wash water after being used to wash the object in the post-electrodeposition rinse section, and separates contaminants generated in the wash water due to the electrolysis process from the wash water, and the concurrent wash water recycling line feeds, to the post-degreasing rinse section, the wash water from which the contaminants have been separated in the electrolytic water treatment apparatus as wash water to be used to wash the object in the post-degreasing rinse section.

7. The electrodeposition coating facility according to claim 6, wherein the post-electrodeposition rinse section is provided with a former-stage post-electrodeposition rinse section and a latter-stage post-electrodeposition rinse section, in the former-stage post-electrodeposition rinse section, the object that has been subjected to electrodeposition coating in the electrodeposition coating section is washed with wash water, in the latter-stage post-electrodeposition rinse section, the object that has been washed in the former-stage post-electrodeposition rinse section is washed with wash water, wash water after being used to wash the object in the former-stage post-electrodeposition rinse section is fed to the post-chemical-conversion rinse section through the filtration process apparatus and the wash water recycling line, and wash water after being used to wash the object in the latter-stage post-electrodeposition rinse section is fed to the post-degreasing rinse section through the electrolytic water treatment apparatus and the concurrent wash water recycling line.

* * * * *